(12) United States Patent
Lin et al.

(10) Patent No.: US 7,797,026 B2
(45) Date of Patent: *Sep. 14, 2010

(54) PORTABLE ELECTRIC DEVICE

(75) Inventors: Chi-Hsiung Lin, Banciao (TW); Hsiang-Ti Hsu, Yonghe (TW)

(73) Assignee: Lite-On Technology Corporation, Taipei (TW)

( * ) Notice: Subject to any disclaimer, the term of this patent is extended or adjusted under 35 U.S.C. 154(b) by 957 days.

This patent is subject to a terminal disclaimer.

(21) Appl. No.: 11/030,027

(22) Filed: Jan. 5, 2005

(65) Prior Publication Data

US 2006/0111160 A1  May 25, 2006

(30) Foreign Application Priority Data

Nov. 19, 2004 (TW) ............................. 93218640 U

(51) Int. Cl.
*H04M 1/00* (2006.01)
*H04B 1/38* (2006.01)

(52) U.S. Cl. ................ 455/575.3; 455/90.3; 455/556.1; 455/566

(58) Field of Classification Search .................... 455/90, 455/575.3, 550.1, 556.1, 556.2, 566, 347, 455/348, 90.3; 345/168–169
See application file for complete search history.

(56) References Cited

U.S. PATENT DOCUMENTS

| 6,151,012 | A  | * | 11/2000 | Bullister ..................... 345/168 |
| 6,728,557 | B1 |   | 4/2004  | Tracy et al. |
| 6,850,226 | B2 | * | 2/2005  | Finke-Anlauff ............. 345/169 |
| 6,999,802 | B2 | * | 2/2006  | Kim ........................ 455/556.2 |
| 7,440,784 | B2 | * | 10/2008 | Chung et al. ............. 455/575.3 |
| 7,447,527 | B2 | * | 11/2008 | Lin et al. ................. 455/575.1 |
| 2003/0087609 | A1 | * | 5/2003 | Cheng ......................... 455/90 |
| 2004/0110529 | A1 |   | 6/2004 | Watanabe et al. |
| 2004/0132482 | A1 |   | 7/2004 | Kang et al. |
| 2004/0192422 | A1 |   | 9/2004 | Watanabe et al. |
| 2004/0198474 | A1 |   | 10/2004 | Jung et al. |
| 2004/0203513 | A1 |   | 10/2004 | Kwon |
| 2004/0203517 | A1 |   | 10/2004 | Park et al. |
| 2004/0203527 | A1 |   | 10/2004 | Matsumoto |
| 2004/0203532 | A1 |   | 10/2004 | Mizuta |
| 2004/0203535 | A1 |   | 10/2004 | Kem et al. |
| 2004/0204197 | A1 |   | 10/2004 | Moon |
| 2004/0209645 | A1 |   | 10/2004 | Park et al. |

* cited by examiner

*Primary Examiner*—Quochien B Vuong
(74) *Attorney, Agent, or Firm*—Apex Juris, pllc; Tracy M Heims

(57) ABSTRACT

A portable electric device, to provide mobile phones and PDA functions, includes a main body and a sub-body. The main body has a first keyboard and a second keyboard that are operated in different directions. The sub-body has a large display screen on one side and a small display screen on the other side. The sub-body is pivotally coupled on one side of the main body, corresponding to a QWERTY keyboard through a biaxial hinge. The sub-body may be selectively having a large display screen or a small display screen, folding over the main body, to cover the QWERTY keyboard, or to be lifted, to form an angle with the main body, to provide different operation modes for the mobile phone or PDA functions.

19 Claims, 4 Drawing Sheets

PORTABLE ELECTRIC DEVICE

FIELD OF THE INVENTION

The present invention relates to a handheld device equipped with mobile communication functions and data processing functions and particularly to a portable electric device that provides a plurality of operation modes according to different functions.

BACKGROUND OF THE INVENTION

A mobile phone aims to provide mobile communication functions, and a personal digital assistant (PDA) aims to provide data processing and storage function. They target different requirements of users. The conventional mobile phone or PDA includes a host, which contains a circuit board and various electronic elements. On the mobile phone, the host has a display screen and a phone keypad (consisting of 0-9, #, *, receive or OFF buttons) on one side. Operation of various functions of the mobile phone is accomplished through the phone keypad. On the PDA, the host has a touch display screen and a plurality of function keys on one side. Its function is mainly accomplished through the operation of a stylus.

In recent years multimedia applications (such as games, videos, movies, music, and the like) have been integrated with the mobile phone or PDA. Under the demand of multimedia applications, vendors have introduced flip mobile phones or PDAs, such as a MOTOROLA model V600 mobile phone (reference can be found in www.motorola.com) mobile phone, NOKIA model 7270 mobile phone (reference can be found in www.nokia.com), or a SONY model PEG-UX50 PDA (reference can be found in www.sony.jp). The flip mobile phone or PDA can provide a larger display screen or other operation modes (such as including a keyboard for data entry). The flip mobile phone has a phone keypad on the host. The flipping cover contains a display screen. The flipping cover is coupled on the top end of the host through a one-way hinge for opening or folding relative to the host. Although the flipping cover can accommodate a large display screen, the one-way hinge allows the flipping cover to swivel only one way, thus limits the operation mode.

These days many new mobile phones also equip with a camera lens for taking dynamic video and still images. To provide a photo mode or other operation mode, the mobile phone with a biaxial hinge has been developed. Reference can be found in U.S. patent publication Nos. 20040110529, 20040132482, 20040192422, and 20040198474. They all provide a mobile phone equipped with a biaxial hinge. The flipping cover is pivotally coupled on the top end of the host through a biaxial hinge, to enable the flipping cover to be lifted, or the display screen to be selectively moved to face or oppose the host. While the display screen is turned with its backside folding over the host, the camera lens of the mobile phone may be used to take pictures in an operation mode like a digital camera.

With the electric products more diversified and versatile, and consumer's demands for multiple function and portability growing, electric devices that integrate the functions of mobile phone and PDA become a trend of product development. As a result, PDA phone or smart phone that equips mobile phone and data processing functions has been developed and introduced. The smart phone generally adopts the structure of mobile phone or PDA. The biaxial hinge mentioned above may also be adopted on the smart phone to provide multiple operation modes. For instance, to use the mobile phone function, the flipping cover may be lifted to use the phone keypad for dialing. To use the PDA function, the flipping cover may be swiveled with the back of the display screen folding over the host, then operation may be performed by touching the display screen with the stylus. Reference of the mobile phone or smart phone adopting a biaxial hinge can be found in U.S. patent publication Nos. 20040203527, 20040203532, 20040203535, and 20040209645.

While the smart phone that adopts the biaxial hinge allows the display screen to be swiveled and folded over the host to provide PDA operation mode, it uses a few keys and the stylus as the main input means. In order to provide a better-input mode, some smart phones adopt a design that integrates a QWERTY keyboard, such as U.S. patent publication Nos. 20040203513 and 20040204197. They mainly have a second hinge or a third hinge to couple the QWERTY keyboard on the host so that the QWERTY keyboard may be folded over or retracted in the host. In the PDA function mode, the QWERTY keyboard may be lifted or pulled out for data entry. However, such a construction has to add an extra QWERTY keyboard and makes the entire structure of the smart phone very complicated and bulky. This is not a desirable design.

U.S. patent publication No. 20040203517 also discloses a smart phone that includes a host and a display screen. The host has a QWERTY keyboard on two sides of the surface. The display screen contains a phone keypad. And the display screen is pivotally coupled on the host in the center through an one-way hinge to swivel horizontally. In the mobile phone operation mode, the display screen and the host are located in the same direction, and cover the QWERTY keyboard on one side. In the PDA operation mode, the display screen may be swiveled horizontally at 90 degrees to make the display screen normal to the host. Then users can operate the QWERTY keyboard on both sides of the host. But in the PDA operation mode, the display screen and the host are parallel. To facilitate data entry on the QWERTY keyboard, the smart phone usually is placed on a desktop, with the screen in parallel with the desktop. Users have to lower the head at a great angle to see the display screen during operating of the keyboard. This causes a great physical strain to the users.

In addition, MOTOROLA has introduced a smart phone model MPx (reference can be found in www.motorola.com). It also has a host and a flipping cover. The host has a QWERTY keyboard and a phone pad on the surface. Pivot seats are installed, respectively, on a top edge and a side edge of the host, and are adjacent to the top edge and the side edge of the host, to allow the flipping cover to be selectively coupled on the pivot seat at the top edge or the side edge. When the flipping cover is pivotally coupled on the pivot seat at the top edge, it may be lifted towards the topside to provide a mobile phone operation mode. When the flipping cover is pivotally coupled on the pivot seat at the side edge, it may be lifted towards one side to provide a PDA operation mode. In the PDA operation mode, the lifted flipping cover forms an angle with the host to allow users to place the phone on a desktop, to facilitate viewing. While it overcomes the viewing problem of U.S. patent publication 20040203517, the MPx model has to employ two pivot seats to provide two different operation modes, to perform the mobile phone or PDA function. As the QWERTY keyboard and the phone keypad are located on the host, to reduce the size, some keys are commonly shared by the QWERTY keyboard and the phone keypad, and setting and switching of the keys have to be done through a firmware to allow one key to generate different output signals. Moreover, the MPx flipping cover has a size proximate to the host. When a user wants to dial a phone number, the flipping cover has to be lifted to strike the phone keypad. On the other hand, when the MPx is functioning as a PDA, the flipping cover has to be lifted. If the user does the operation by the stylus, he will find out that doing the operation is more difficult than doing the operation by the QWERTY keyboard. U.S. Pat. No. 6,728,557 discloses a device that provides an operation mode like the MPx smart phone of MOTOROLA. It differs from the MPx by having a biaxial hinge, located on the juncture of the top edge and a side edge of the host, to pivotally couple with a flipping cover, so that the flipping cover may be lifted towards the top edge or the side edge. But the problems of the MPx still exist in the patent 557.

All the conventional techniques or cited references mentioned above, whether for mobile phone, PDA or smart phone, mostly adopt a one-way hinge or a biaxial hinge to swivel the flipping cover relative to the host to provide different operation modes. Take the smart phone that provides the functions of a mobile phone and a PDA for instance, it has to provide a mobile phone operation mode to receive calls and perform dialing, and a PDA operation mode with a QWERTY keyboard and a stylus to do data entry. They all cannot implement these diversified operation modes with a satisfactory result. There is still room for improvement.

SUMMARY OF THE INVENTION

In view of the aforesaid problems occurred to the conventional mobile phones, PDAs or smart phones that have an one-way hinge or biaxial hinge located on either the top edge or a side edge of the host to provide different operation modes, but still cannot offer an optimal operation condition in some operation modes for multifunctional smart phones, the primary object of the invention is to provide a portable electric device adaptable to varying operation modes.

The portable electric device according to the invention includes a main body, a sub-body and a biaxial hinge. The main body has a transverse first keyboard and a longitudinal second keyboard. The sub-body has a large display screen on one side and a small display screen on an opposite side. The biaxial hinge is located in a middle portion on one side of the main body, corresponding to the first keyboard. The sub-body may be swiveled about the a first axis or a second axis through the biaxial hinge, to fold the large display screen or the small display screen over the first keyboard, or to be lifted, to form an angle with the main body, to provide varying operation modes.

In one aspect, when the sub-body is folded over the main body, the second keyboard is not being covered. Hence whether the large display screen is folded over the main body, or the small display screen is folded over the sub-body, users can hold the device longitudinally, to directly operate the second keyboard, or see or operate the large display screen. Or the sub-body may be lifted relative to the main body for an angle to enable users to hold the device transversely or place the device on a desktop to operate the first keyboard. Hence when the invention is adopted on a smart phone that equips mobile phone functions and PDA functions, it can provide an optimal operation condition to suit different operation requirements.

The foregoing, as well as additional objects, features and advantages of the invention will be more readily apparent from the following detailed description, which proceeds with reference to the accompanying drawings.

DESCRIPTION OF THE PREFERRED EMBODIMENTS

The portable electric device according to the invention is an electric data processing device such as a mobile phone, PDA, PDA phone, smart phone, pocket PC, hand-held PC or the like. In the following discussion, a smart phone is used as an embodiment.

Figure 1:
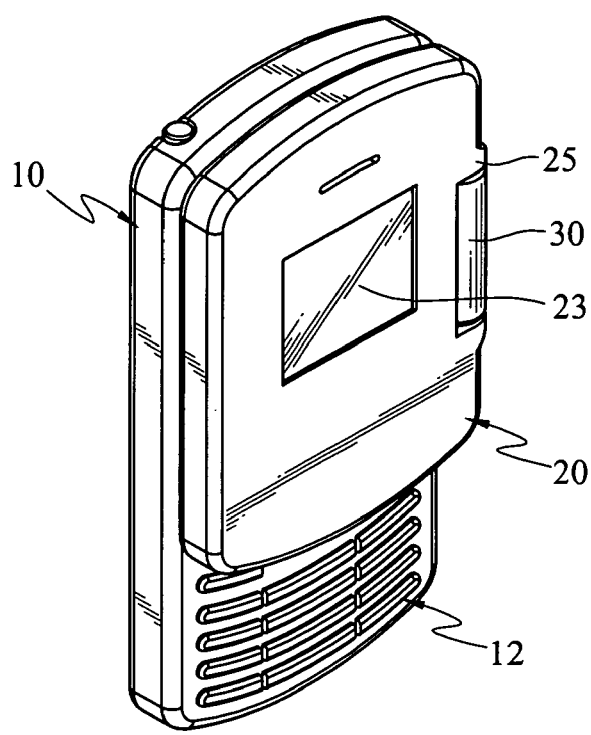
FIGS. 1 through 4 are schematic views of the invention in different use conditions.
Figure 2:
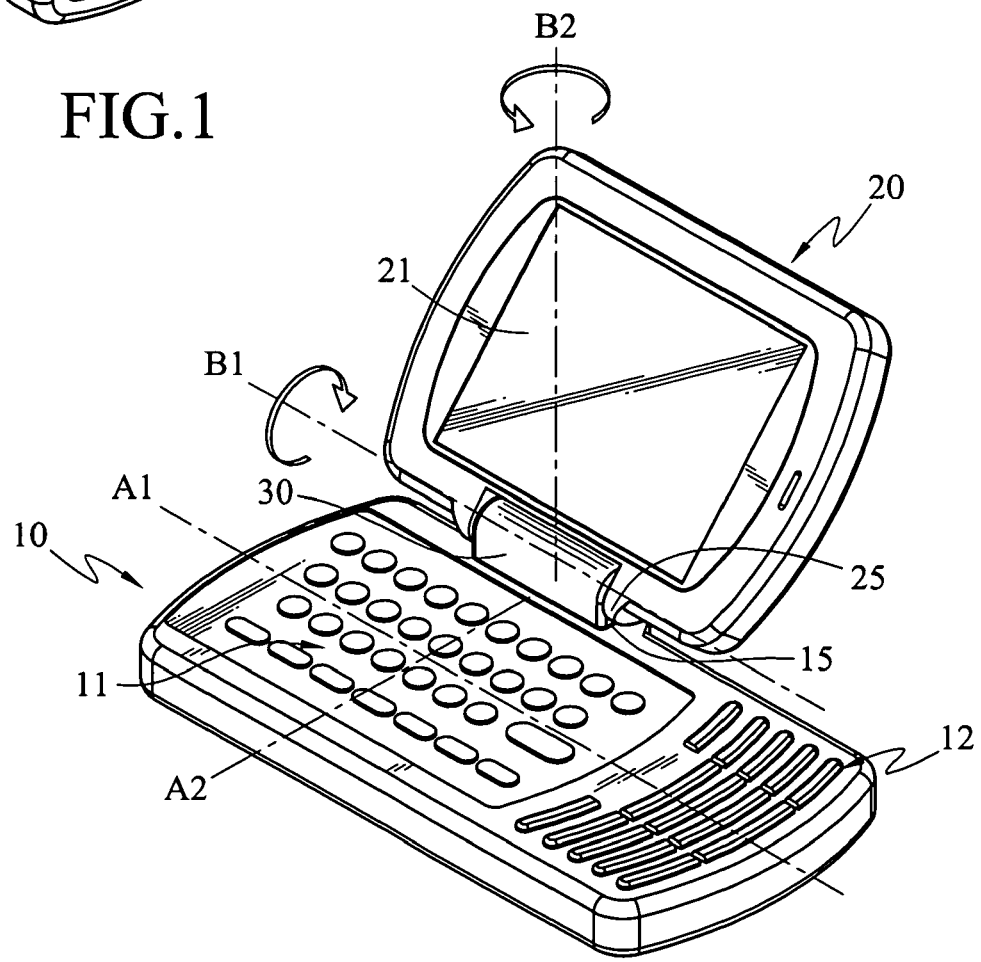
Figure 3:
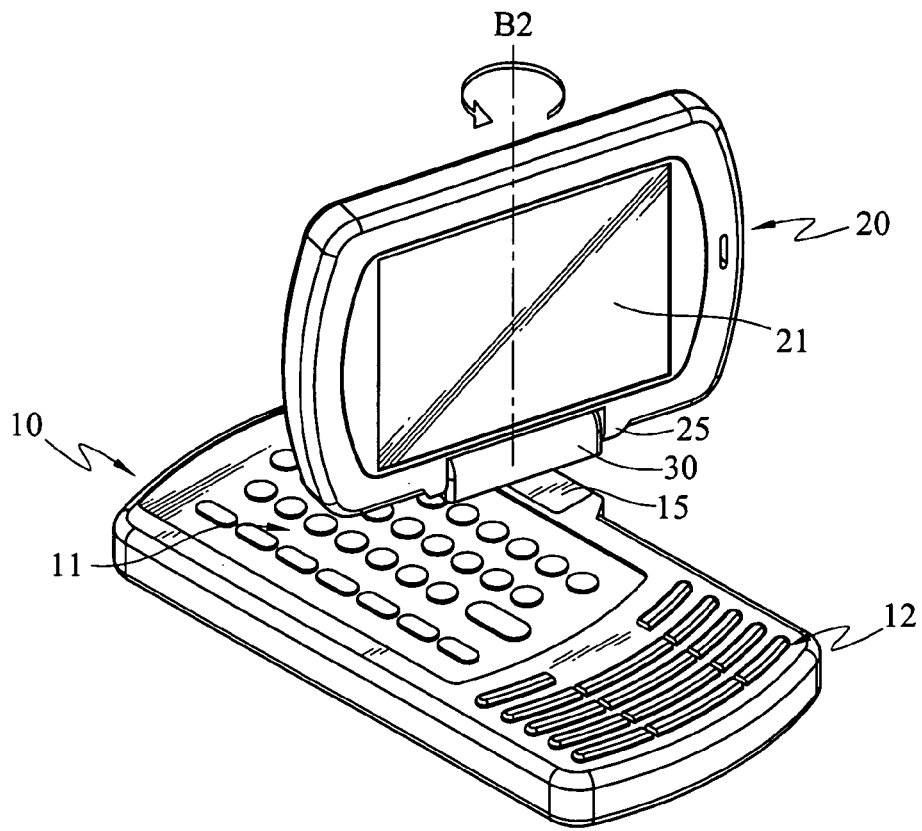

Referring to FIGS. 1, 2 and 3, the portable electric device according to the invention includes a main body 10, a sub-body 20 and a biaxial hinge 30. The main body 10 is rectangular with the long side defined as a longitudinal axis A1 and the short side defined as a transverse axis A2. The main body 10 has a first keyboard 11 and a second keyboard 12 on one surface of the main body 10. The first keyboard 11 is operated in a correct visual direction of printed notations which are horizontal to the transverse axis A2. Namely, when a user looks at the printed notations on the first keyboard 10, the transverse axis A2 of the main body 10 directs towards the front side of the user, so that the printed notations are positioned in the correct visual direction. The second keyboard 12 is operated in a correct visual direction of printed notations which are horizontal to the longitudinal axis A1. Namely, when the user looks at the printed notations on the second keyboard 12, the longitudinal axis A1 of the main body 10 directs towards the front side of the user so that the printed notations are positioned in the correct visual direction.

Moreover, the main body 10 has a connection seat 15 on about the middle portion of the first keyboard 11, corresponding to the front side of the vision upon the first keyboard 11.

The sub-body 20 is rectangular and has a size slightly larger than the first keyboard 11. The sub-body 20 has a large display screen 21 on a first surface of the sub-body 20 and a small display screen 23 on a second surface of the sub-body 20 opposite to the first surface on which the large display screen is. The sub-body 20 has a pivot seat 25 on about the middle portion of one side.

Figure 4:
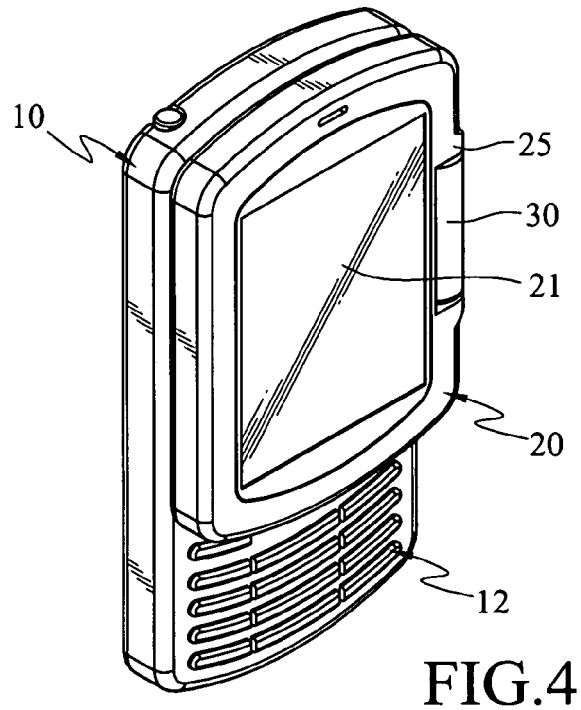

The biaxial hinge 30 is coupled with the connection seat 15 of the main body 10 and the pivot seat 25 of the sub-body 20 to define a first swivel axis B1 horizontal to the main body 10, and a second swivel axis B2 normal to the main body 10, so that the main body 10 and the sub-body 20 may be turned relatively to each other about the two axes. In other words, the first swivel axis B1 is horizontal to the longitudinal axis A1. The second swivel axis B2 is normal to both the longitudinal axis A1 and the transverse axis A2. Based on the first swivel axis B1, the sub-body 20 may be folded over the main body 10 to cover the first keyboard 1 (as shown in FIG. 1) or to be lifted relative to the main body 10 (as shown in FIG. 2), to form an angle with the main body 10. Based on the second swivel axis B2, the sub-body 20 may be swiveled horizontally relative to the main body 10 at 360 degrees (as shown in FIG. 3) to turn the small display screen 23 of the sub-body 20 corresponding to the first keyboard 11 of the main body 10, and fold the sub-body 20 about the first swivel axis B1 over the main body 10, to expose the large display screen 21 on the outside (as shown in FIG. 4).

Figure 5A:
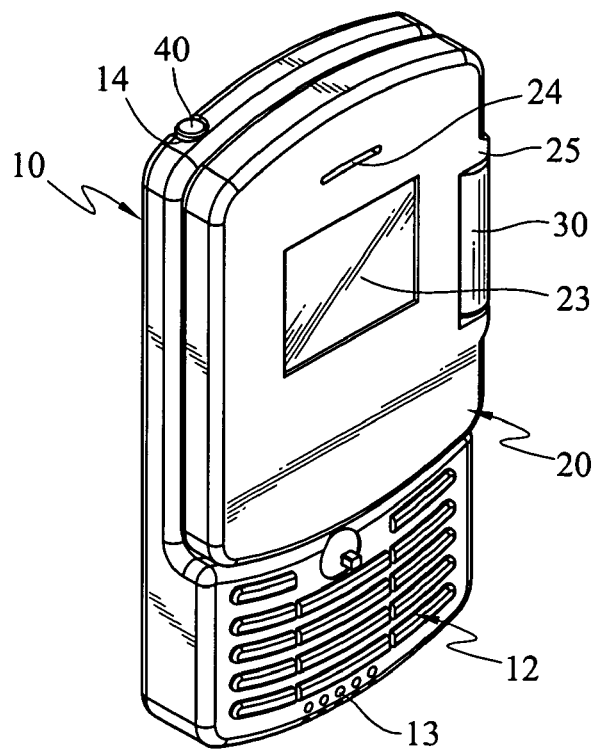
FIGS. 5A and 5D are schematic views of an embodiment of the invention in different use conditions.
Figure 5B:
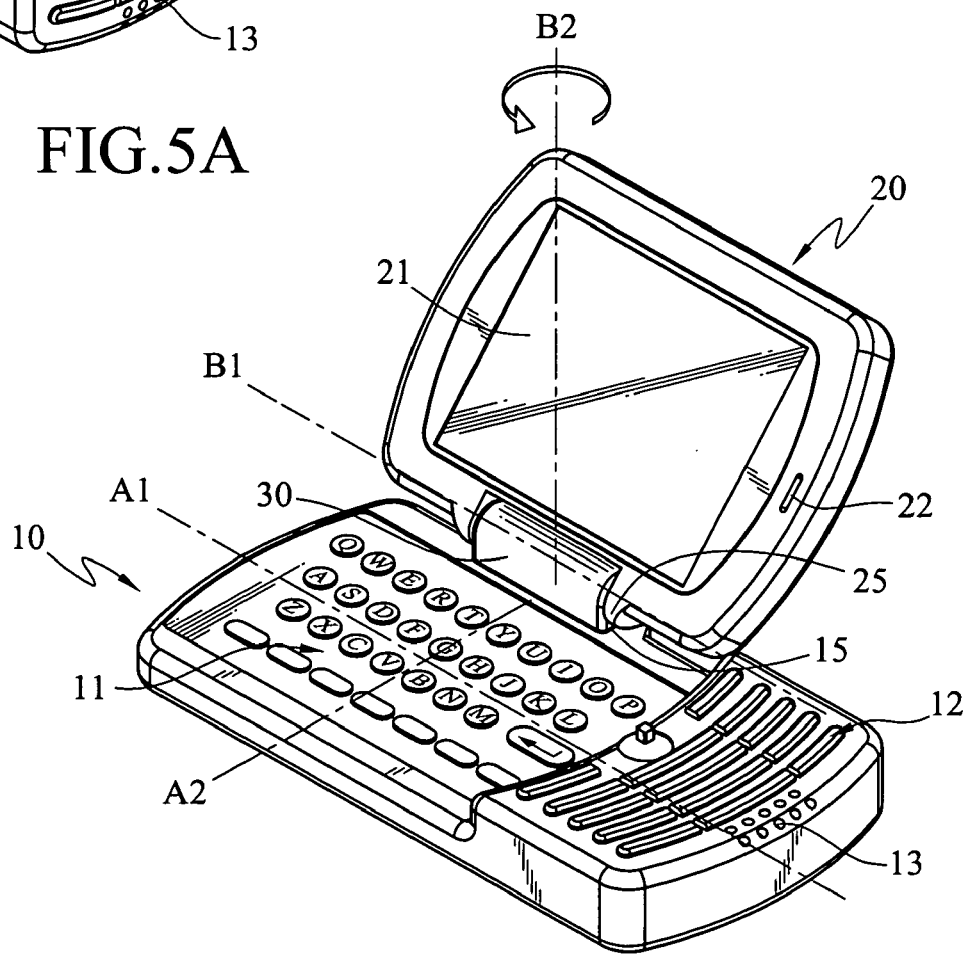

Refer to FIGS. 5A to 5D for an embodiment of the invention that is adopted on a PDA phone or a smart phone. It integrates the mobile phone function and data processing and storage functions of the PDA. On the mobile phone function, at least one phone keypad is provided to perform an operation mode for receiving calls or dialing. The phone keypad includes at least 0-9, #, *, receive or OFF buttons. When calling signals are received, the user can receive the phone call. The user also can enter a phone number to generate signals. For the PDA function, it provides at least a stylus input operation mode or a QWERTY keyboard input operation mode. The QWERTY keyboard includes at least A-Z, Enter, Space, Backspace or Delete buttons. Referring to FIGS. 5A and 5B, the first keyboard 11 is a QWERTY keyboard printed with English characters. The second keyboard 12 is a phone keypad printed with numerals. In order to provide mobile communication functions, the main body 10 further has at least one audio port 13 on a lower side, and the sub-body 20 has a first audio port 22 and a second audio port 24 corresponding respectively to the large display screen 21 and the small display screen 23. In order to provide data processing functions, the large display screen 23 on the sub-body 20 is a touch screen, and one side of the main body 10 corresponding to the first keyboard 11 and the second keyboard 12 has a housing trough 14 to hold a stylus 40, to touch the large display screen 21. Moreover, on the main body 10, the second keyboard 12 and the first keyboard 11 have an elevation difference, which is proximate to the thickness of the sub-body 20, so that when the sub-body 20 is folded over the main body 10, an optimal profile may be formed.

When the invention is adopted on a smart phone, it includes at least:

A first style shown in FIG. 5A, in which the large display screen 21 of the sub-body 20 faces the first keyboard 11 and folds over the main body 10. The sub-body 20 covers the first keyboard 11. The second keyboard 12 of the main body 10 is uncovered and exposed. In the first style, a user can hold or grasp the main body 10 longitudinally with the printed numerals of the second keyboard 12 facing the user in the correct visual direction. The user can receive phone calls and dial phone numbers through the second keyboard 12. The small display screen 23 on the sub-body 20 can display the calling phone number or the dialing phone number. When the phone signal is connected, the audio port 13 of the main body 10 and the second audio port 24 of the sub-body 20 can receive or transmit voices. Hence the first style includes a folding mode, receiving an operation mode and a dialing operation mode of a mobile phone.

A second style shown in FIG. 5B in which the large display screen 21 of the sub-body 20 faces the first keyboard 11, and the sub-body 20 may be lifted about the first swivel axis B1 to form an angle with the main body 10. In the second style, the main body 10 may be positioned transversely relative to the user with the printed characters of the first keyboard 11 facing the user in a correct visual direction, and the user can adjust the sub-body 20 to an optimal visual angle for operation. And the main body 10 may be placed on a desktop and the first keyboard 11 may be used for entering input. Hence the second style aims to provide PDA functions and QWERTY keyboard operations.

Figure 5C:
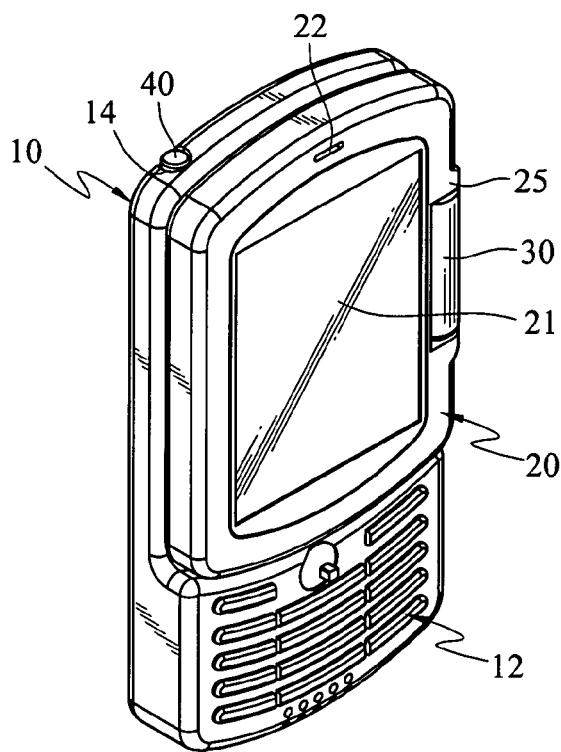

A third style shown in FIG. 5C in which the sub-body 20 is turned about the second swivel axis B2 at 180 degrees to move the large display screen 21 opposite the first keyboard 11, and the sub-body 20 is turned about the first swivel axis B1, to be folded over the main body 10 with the large display screen 21 facing outwards. In the third style, the user can hold or grasp the main body 10 transversely or longitudinally, and use the stylus to perform functions such as functional linking or entering input strokes on the large display screen 21. The user also can hold the main body 10 longitudinally to receive phone calls and dial numbers through the second keyboard 11 on the main body 10. The large screen 21 can display the calling information, and the audio port 13 of the main body 10 and the first audio port 22 of the sub-body 22 can receive and transmit phone calls. Hence the third style includes the touch operation mode of a PDA, a phone receiving operation mode and a dialing operation mode to make phone call. It also can directly execute the phone receiving operation mode upon receiving a calling signal, while performing the PDA functions.

Figure 5D:
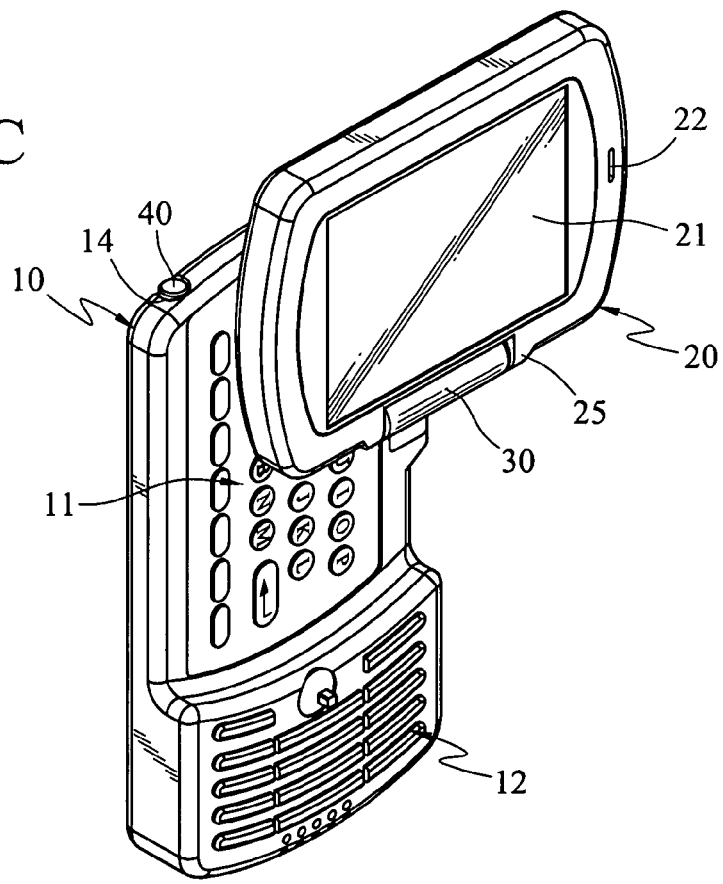

These days multimedia applications almost become a mandatory feature for the smart phone, such as games, taking video and still images, and the like. In terms of the games, when the invention is adopted on the smart phone, the second style can also provide a transverse game operation mode (through the first keyboard 11). And the third style can provide a longitudinal game operation mode (through the second keyboard 12). In terms of game applications, the smart phone adopted on the invention further includes:

A fourth style as shown in FIG. 5D. The sub-body 20 may be folded over the main body 10 with the large display screen 21 facing outside. The sub-body 20 may be swiveled about the second swivel axis B2 at 90 degrees to become normal to the main body 10. Then the second keyboard 12 may be used to perform game operation transversely. Hence the fourth style can perform a transverse game in a longitudinal operation mode.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A portable electronic device, comprising:
a main body having a first keyboard and a second keyboard, the first keyboard and the second keyboard being on a surface of the main body, the main body having a longitudinal axis along a long side of the surface of the main body and a transverse axis along a short side of the surface of the main body
a sub-body having a large display screen on a first surface of the sub-body and a pivot seat with a cutout from said sub-body and located in the longitudinal side of the sub-body where said cutout has at least two opposite walls; and
a biaxial hinge, inserted in the cutout and coupled to the main body with the sub-body, the biaxial hinge having
a first swivel axis being horizontal or perpendicular to the longitudinal axis and connected to two opposite walls of the cutout; and
a second swivel axis approximately normal to both the longitudinal axis and the transverse axis, so as to alternatively turn over the sub-body along the first swivel axis and swivel the sub-body along the second swivel axis
the sub-body being capable of rotating via the first swivel axis and the second swivel axis, so that the longitudinal side of the sub-body is perpendicular to the longitudinal axis of the main body.

2. The portable electronic device of claim 1, wherein the first keyboard is a QWERTY keyboard.

3. The portable electronic device of claim 1, wherein the second keyboard is a phone keypad.

4. The portable electronic device of claim 1, wherein the first keyboard is operated in a correct visual direction of printed notations which is horizontal to the transverse axis, and the second keyboard is operated in a correct visual direction of printed notations which is horizontal to the longitudinal axis.

5. The portable electronic device of claim 1, wherein the main body has an elevation difference for the first keyboard and the second keyboard that is proximate to the thickness of the sub-body.

6. The portable electronic device of claim 1, wherein the large display screen is a touch screen.

7. The portable electronic device of claim 1, wherein the sub-body has a small display screen on a second surface of the sub-body opposite to the large display screen.

8. The portable electronic device of claim 1, wherein the sub-body has a first audio port on the one side where the large display screen is located.

9. The portable electronic device of claim 7, wherein the sub-body has a second audio port on the other side where the small display screen is located.

10. The portable electronic device of claim 1, wherein the sub-body is slightly larger than the first keyboard of the main body.

11. The portable electronic device of claim 1, wherein the main body has a connection seat on the middle portion of the first keyboard, the sub-body has a pivot seat on the middle portion of a side of the sub-body, and the biaxial hinge is coupled with the connection seat and the pivot seat.

12. The portable electronic device of claim 1, wherein the biaxial hinge is in the middle portion of the longitudinal axis.

13. A portable electronic device, comprising:
a main body having a first keyboard and a second keyboard, the first keyboard and the second keyboard being on a surface of the main body, the main body having a longitudinal axis along a long side of the surface of the main body and a transverse axis along a short side of the surface of the main body and a connection seat on the middle portion of the first keyboard;
a sub-body having a large display screen on a first surface of the sub-body and a pivot seat on the middle portion of a side of the sub-body;
the main body has an elevational difference between the first keyboard and the second keyboard that is proximate to the thickness of the sub-body; and
a biaxial hinge, coupled with the connection seat of said main body and the pivot seat of said sub-body, the biaxial hinge having
a first swivel axis being horizontal to the longitudinal axis; and
a second swivel axis approximately normal to both the longitudinal axis and the transverse axis, so as to alternatively turn over the sub-body along the first swivel axis and swivel the sub-body along the second swivel axis.

14. The portable electronic device of claim 13, wherein the first keyboard is operated in a correct visual direction of printed notations which is horizontal to the transverse axis, and the second keyboard is operated in a correct visual direction of printed notations which is horizontal to the longitudinal axis.

15. The portable electronic device of claim 13, wherein the large display screen is a touch screen.

16. The portable electronic device of claim 13, wherein the sub-body has a small display screen on a second surface of the sub-body opposite to the large display screen.

17. The portable electronic device of claim 16, wherein the sub-body has a second audio port on the other side where the small display screen is located.

18. The portable electronic device of claim 13, wherein the sub-body has a first audio port on the one side where the large display screen is located.

19. The portable electronic device of claim 13, wherein the biaxial hinge is in the middle portion of the longitudinal axis.

* * * * *